July 28, 1959 — C. B. CALL — 2,897,418
MEANS FOR PACKAGING MULTIPLE UNIT CAPACITOR
Filed Jan. 9, 1956
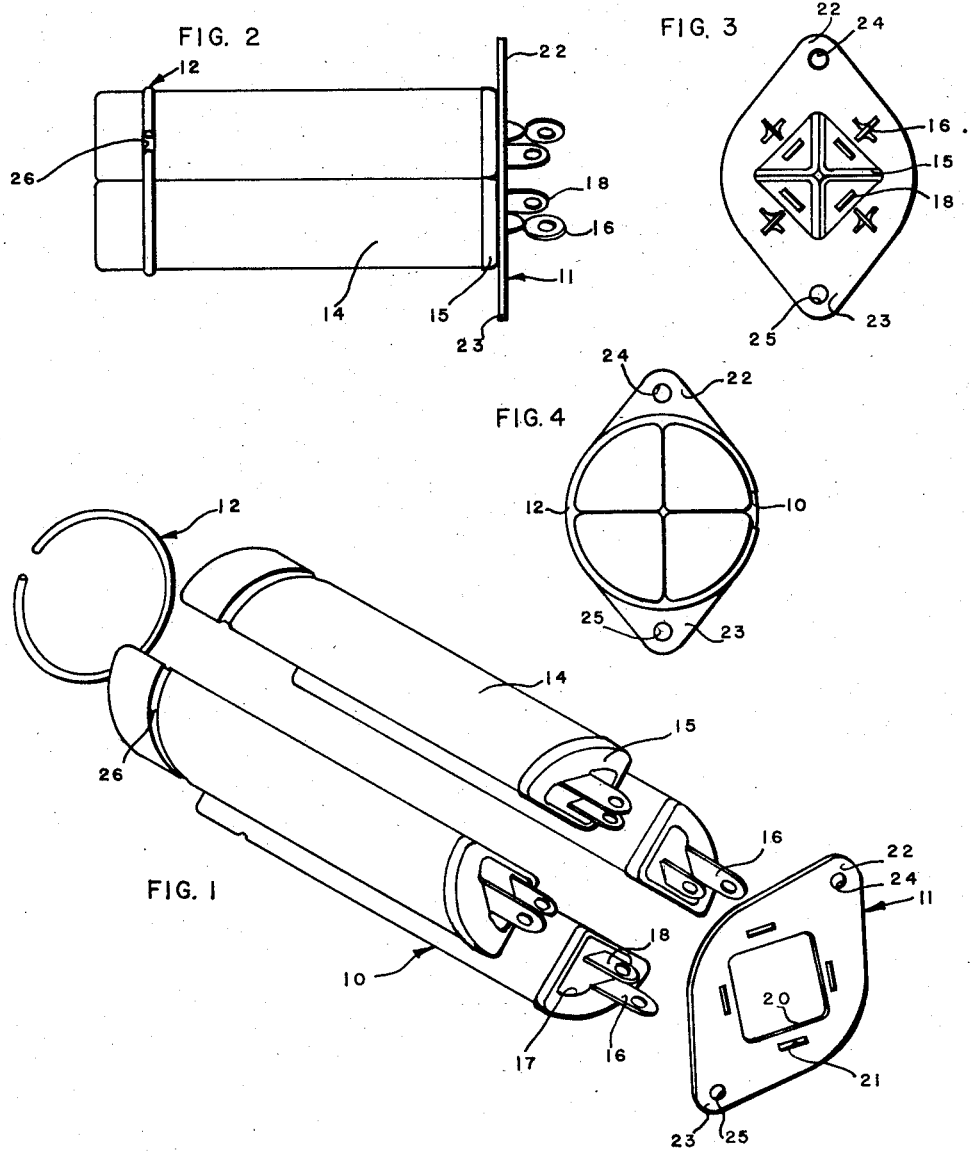
INVENTOR.
Clinton B Call
BY

United States Patent Office 2,897,418
Patented July 28, 1959

2,897,418

MEANS FOR PACKAGING MULTIPLE UNIT CAPACITOR

Clinton B. Call, Oceanside, Calif.

Application January 9, 1956, Serial No. 558,143

2 Claims. (Cl. 317—230)

My invention relates generally to wet or dry electrolytic capacitors and more specifically to the means for packaging multiple unit capacitors.

It has become the general practice of capacitor manufacturers to package a plurality of electrolytic capacitors in one unit. Such practice saves space, weight and cost in the assembled electronic unit. This has become particularly widespread in the television and radio industry.

Such practice has, however, resulted in certain disadvantages, the most serious among which is the problem of inventory control. Such multiple capacitor units frequently include up to four independent capacitors each of a different capacitor value. The number of combinations therefore becomes exceedingly large and repair shops for such electronic devices as television and radio must carry an exceedingly large and diversified inventory in order to meet the demands of business. Both the space involved and the control of the inventory adds unnecessary expense to the repair operation.

It is one of the primary objects of my invention to provide an electrolytic capacitor which can be ganged with other units of the same or different capacitance value to form a multiple unit whereby large inventories are not necessary.

It frequently occurs that one capacitor of a multiple unit becomes defective and the remaining ones are still in good condition. In order to replace the defective capacitor, the remaining good ones must also be replaced.

It is a further object of my invention to provide a multiple capacitor unit which permits the replacement of only the section or sections which are defective, thus resulting in a saving in the cost of the capacitor as well as the time involved in reconnecting the other units.

The rapid expansion of the electronic industry has brought about a requirement for the use of unskilled labor in the assembly of electronic units. In order to facilitate the use of such labor, it is desirable to use components which are readily identifiable, such as by color.

It is also among the objects of my invention to provide a multiple electrolytic capacitor unit having individual segments having different colors for identifying different capacitor values.

It is still another object of my invention to provide a gangable multiple unit capacitor which can be readily assembled by unskilled labor and without the use of any special tools or equipment.

These and other objects and advantages will become apparent from the following description and the drawings in which:

Fig. 1 is an exploded perspective view of one preferred form of multiple capacitor units embodying the principles of my invention;

Fig. 2 is an assembled side elevation of the form of my invention shown in exploded view in Fig. 1;

Fig. 3 is a bottom plan view of the form shown in Fig. 2; and

Fig. 4 is a top plan view of the form shown in Fig. 2.

As will be seen in Fig. 1, one of the preferred forms of my invention includes a plurality of capacitor segments designated generally by the numeral 10, a base assembly plate designated generally 11 and a top locking member designated generally 12.

I prefer to form the segments 10 having a cross section in the shape of a segment of a circle (herein shown as a quadrant) in order to conserve space. Each of the segments includes a capacitor body 14 which contains the capacitor, an end cap 15 having a twist lug 16 preferably integral therewith and projecting downwardly therefrom. The cap 15 is made of conductive material and is electrically connected to one side of the capacitor contained in the body 14.

The cap 15 has an opening 17 in the end thereof through which projects a terminal lug 18. It will be understood that the terminal lug 18 is spaced and insulated from the edges of the opening 17. The terminal lug 18 is connected to the other side of the capacitor which is contained in the body 14.

The outer surface of the body 14 may be made of nonconductive material in the event that it is desired to electrically isolate each of the capacitors and may be colored in accordance with a predetermined color scheme for purposes of capacitance rating identification.

The base assembly plate 11 is formed with a central opening 20 and a plurality of spaced slots 21. When it is desired to gang or assemble the individual capacitor units into a multiple assembly, each of the twist lugs 16 is inserted through one of the slots 21 and twisted as indicated in Figs. 2 and 3. It will be understood that the spacing of the slots 21 is such that when the twist lugs 16 are inserted therein that the body segments 10 fit together to form a compact unit, as indicated in Figs. 2 and 4.

The base assembly plate 11 may be formed of conductive material which electrically interconnects the separate capacitors and acts as a grounding plate, or may be dielectric if it is not desired to ground the capacitors.

In order to secure the multiple unit in a chassis or frame, the assembly plate is provided with opposite, laterally extending ears 22 and 23 having mounting bolt holes 24 and 25.

Means is provided for locking the top ends of the units 10 in assembled position. In the preferred embodiment shown the top locking means 12 comprises a resilient snap ring which is adapted to fit into an annular groove defined by each individual groove 26 formed in the body 10 adjacent the top thereof.

It will be understood that the top locking means may vary greatly in its configuration. A cup shaped cap, or a flat band may be substituted therefor. I prefer the form shown because it is a positive lock and is less expensive to manufacture.

It therefore becomes readily apparent that multiple unit dielectric capacitors may be readily assembled in a large variety of combinations by assembling a plurality of the units 10, inserting each of the tabs 16 through the respective slot 21, and placing the locking ring 12 around the upper end so that it fits in the annular groove. The assembled unit is then secured to the base 11 by twisting each of the twist lugs 16.

It is also apparent that if only three capacitors are desired, that one of the body segments 10 may be a dummy.

If it becomes desirable to replace a defective capacitor, the wiring leads to the defective segment are unsoldered; the twist lug removed or bent straight, and the ring 12 removed whereby the one section may be replaced without the expense and time of unsoldering and removing all other units. It is also apparent that replacement of the correct value may be more readily assured and more quickly selected if the individual segments are colored for value identification.

Such arrangement is particularly advantageous to radio and television repair shops. Such repair shop is required to stock only a few each of the more common capacitor values in order to be able to replace the defective capacitor in most electronic circuits.

I have described and illustrated my invention in one of its most common and preferred forms wherein the assembled or ganged unit is composed of four segments. It should be understood however that other members of segments can be used and that the individual units are not necessarily confined to segments of a cylinder. It should also be understood that even though quadrant sections are used, one or more thereof may be dummies in the event that three or less capacitors are required.

The drawings and descriptions thereof are for purposes of illustration only and are not to be considered as a limitation of my invention, the only limitations being set forth in the appended claims.

I claim:

1. A multiple unit capacitor housing comprising: a plurality of removable single unit capacitor housings, each said housing having a solder lug depending from the base thereof, said base being open to permit a second solder lug to extend therethrough parallel to and spaced from said first mentioned lug; a base plate formed with a plurality of slots, said slots being spaced to receive the first mentioned solder lug of each single capacitor housing unit to thereby secure the base ends of each said single capacitor housing units in assembled relation; means removably disposed adjacent the upper ends of said single housing units to secure the upper ends thereof in assembled relation, said last named means comprising a friction engaging ring encompassing all of said individual units.

2. A multiple unit capacitor comprising: a plurality of removable single unit capacitors, each forming a segment of the multiple unit, each said unit comprising, a conductive housing, a capacitor disposed therein having one side conductively connected to said housing, said housing having a depending twistable solder lug depending from the base thereof and an aperture in said base, a second solder lug electrically connected to the other side of said capacitor and depending in spaced relation through said base; a base assembly plate formed with a plurality of spaced slots adapted to receive said first mentioned solder lugs whereby said single unit capacitor are held in assembled relation; and means for securing the upper ends of said single unit capacitors in assembled relation comprising a removable ring adapted to be removably disposed around the upper assembled end.

References Cited in the file of this patent

UNITED STATES PATENTS

| | | |
|---|---|---|
| 1,179,495 | Burkardt | Apr. 18, 1916 |
| 1,653,579 | Marko | Dec. 20, 1927 |
| 2,129,000 | Given | Sept. 6, 1938 |
| 2,139,437 | Biniek | Dec. 6, 1938 |
| 2,142,705 | Tarr | Jan. 3, 1939 |
| 2,671,126 | Brennan | Mar. 2, 1954 |

FOREIGN PATENTS

| | | |
|---|---|---|
| 442,733 | Italy | Nov. 30, 1948 |